(12) United States Patent
Tarumoto et al.

(10) Patent No.: US 10,788,436 B2
(45) Date of Patent: Sep. 29, 2020

(54) X-RAY EXAMINATION DEVICE

(71) Applicant: ISHIDA CO., LTD., Kyoto-shi, Kyoto (JP)

(72) Inventors: Yoshinori Tarumoto, Ritto (JP); Kazuhiro Suhara, Ritto (JP); Osamu Hirose, Ritto (JP); Atsushi Iwai, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 210 days.

(21) Appl. No.: 15/766,714

(22) PCT Filed: Oct. 7, 2016

(86) PCT No.: PCT/JP2016/079926
§ 371 (c)(1),
(2) Date: Apr. 6, 2018

(87) PCT Pub. No.: WO2017/061593
PCT Pub. Date: Apr. 13, 2017

(65) Prior Publication Data
US 2018/0321167 A1 Nov. 8, 2018

(30) Foreign Application Priority Data
Oct. 9, 2015 (JP) .................................. 2015-201349

(51) Int. Cl.
*G01N 23/083* (2018.01)
*G01N 23/18* (2018.01)
(Continued)

(52) U.S. Cl.
CPC ........... *G01N 23/083* (2013.01); *G01N 23/04* (2013.01); *G01N 23/16* (2013.01); *G01N 23/18* (2013.01);
(Continued)

(58) Field of Classification Search
CPC .... G01N 23/04; G01N 23/18; G01N 23/2304; G01V 5/0016; G06T 7/13; G06T 7/174; G06T 11/008
See application file for complete search history.

(56) References Cited

U.S. PATENT DOCUMENTS 8,068,656 B2 * 11/2011 Hirose ................... G01N 23/04
382/132
2006/0020203 A1 * 1/2006 Tamura ..................... G06T 5/20
600/437
(Continued)

FOREIGN PATENT DOCUMENTS

CN 101639936 A 2/2010
CN 102289000 A 12/2011
(Continued)

OTHER PUBLICATIONS

English translation of JP2012073056 (Year: 2012).*
(Continued)

*Primary Examiner* — Dani Fox
*Assistant Examiner* — Soorena Kefayati
(74) *Attorney, Agent, or Firm* — Global IP Counselors, LLP

(57) ABSTRACT

Ad. X-ray inspection apparatus includes a conveyance unit, an X-ray radiation unit, an X-ray detection, unit, and an image processing unit. The X-ray detection unit has a plurality of direct conversion-type X-ray detection element arrays disposed, side-by-side in rows along a direction intersecting both a conveyance direction in which an object is conveyed by the conveyance unit and a radiation direction in which X-rays are radiated by the X-ray radiation unit The image processing unit has an edge detection unit configured to carry out edge detection processing on an X-ray transmission image to generate an edge detected image, a horizontal direction gradation unit configured to carry out hori-
(Continued)

zontal direction gradation processing on the edge detected image to generate a horizontal direction gradation linage, and a synthesizing unit configured to synthesize the X-ray transmission image and the horizontal direction gradation image to generate a post-processing X-ray transmission image.

6 Claims, 18 Drawing Sheets

(51) Int. Cl.
G01T 1/24 (2006.01)
G01V 5/00 (2006.01)
G01N 23/16 (2018.01)
G01N 23/04 (2018.01)
G06T 7/13 (2017.01)
G01N 23/2204 (2018.01)

(52) U.S. Cl.
CPC .......... *G01N 23/2204* (2013.01); *G01T 1/24* (2013.01); *G01V 5/0016* (2013.01); *G06T 7/13* (2017.01)

(56) References Cited

U.S. PATENT DOCUMENTS

| | | | |
|---|---|---|---|
| 2006/0256924 A1 | 11/2006 | Morton et al. | |
| 2008/0018919 A1* | 1/2008 | Ohkawa | G06T 7/13 358/1.9 |
| 2008/0304622 A1* | 12/2008 | Morton | G01V 5/0016 378/51 |
| 2009/0214133 A1* | 8/2009 | Aoyama | G06T 5/002 382/268 |
| 2009/0218491 A1* | 9/2009 | Morokuma | G03F 1/86 250/310 |
| 2009/0268979 A1* | 10/2009 | Li | H04N 7/012 382/274 |
| 2010/0008574 A1* | 1/2010 | Ishiga | G06T 5/20 382/167 |
| 2011/0019933 A1* | 1/2011 | Noda | G06T 5/002 382/260 |
| 2011/0311022 A1* | 12/2011 | Kappler | G01T 1/247 378/19 |
| 2012/0145910 A1* | 6/2012 | Suyama | G01V 5/005 250/366 |
| 2012/0193548 A1* | 8/2012 | Marcovici | G01T 1/243 250/393 |
| 2012/0257809 A1* | 10/2012 | Miyamoto | G06T 5/50 382/132 |
| 2012/0300904 A1* | 11/2012 | Shimada | A61B 6/542 378/62 |
| 2013/0011040 A1* | 1/2013 | Kido | A61B 6/548 382/132 |
| 2013/0200269 A1* | 8/2013 | Abraham | G01T 1/1647 250/393 |
| 2013/0208852 A1* | 8/2013 | Koishi | A61B 6/548 378/19 |
| 2014/0294151 A1* | 10/2014 | Suyama | G01N 23/083 378/62 |
| 2014/0341350 A1* | 11/2014 | Muroi | A61B 6/06 378/62 |
| 2015/0250441 A1* | 9/2015 | Okuno | A61B 6/5205 378/62 |
| 2015/0310602 A1* | 10/2015 | Lee | G06T 7/13 382/132 |
| 2016/0306053 A1* | 10/2016 | Steadman Booker | G01T 1/2018 |
| 2016/0349192 A1* | 12/2016 | Yamakawa | G01N 23/044 |
| 2017/0027533 A1* | 2/2017 | Sakaguchi | A61B 6/544 |

FOREIGN PATENT DOCUMENTS

| | | |
|---|---|---|
| JP | H11-84011 A | 3/1999 |
| JP | 2009-192519 A | 8/2009 |
| JP | 2011-028588 A | 2/2011 |
| JP | 2011-145073 A | 7/2011 |
| JP | 2012-073056 A | 4/2012 |
| JP | 2012073056 * | 4/2012 |
| JP | 2013-101041 A | 5/2013 |
| JP | 2013-101042 A | 5/2013 |
| JP | 2013-210390 A | 10/2013 |
| JP | 5626835 B2 | 11/2014 |
| WO | 2011033837 A1 | 3/2011 |
| WO | 2015111728 A1 | 7/2015 |

OTHER PUBLICATIONS

Translation of the Written Opinion of the International Searching Authority, originally dated Dec. 27, 2016, Translation dated Apr. 19, 2018.
Takashi Ishidate, "Color Image Correction by Histogram Spreading/Equalization—Correcting a Histogram to Improve Image Definition", [retrieval date : Oct. 5, 2015], Internet, URL: http://codezine.jp/article/detail/214, Dec. 7, 2005 (English Translation Title: "Correction of color image by expansion/ flattening of histogram").
The extended European search report dated May 23, 2019.

* cited by examiner (a)

(b)

(a)

(b)

(a)

(b)

X-RAY EXAMINATION DEVICE

CROSS-REFERENCE TO RELATEED APPLICATIONS

This U.S. National stage application claims priority under 35 U.S.C. § 119(a) to Japanese Patent Application. No. 2015-201349, filed in Japan on Oct. 9, 2015, the entire contents of which are hereby incorporated herein by reference.

TECHNICAL FIELD

The present disclosure relates to an X-ray inspection apparatus.

BACKGROUND ART

An X-ray inspection apparatus including a direct conversion-type X-ray detection element array converting X-rays into electric charge is known as an X-ray inspection apparatus detecting foreign matters included in an object to be inspected by using the transparency of X-rays (see, for example, Japanese Patent No. 5626835). The direct conversion-type X-ray detection element array has, for example, a high level of sensitivity with respect to soft X-rays, and thus is effective in a case where a foreign matter formed of a material unlikely to absorb hard X-rays and likely to absorb soft X-rays (for example, a nonmetal such as glass and rubber, and a light metal such as aluminum) is detected.

SUMMARY OF INVENTION

Technical Problem

In an X-ray inspection apparatus as described above, a plurality of direct conversion-type X-ray detection element arrays may be disposed side-by-side in rows along a direction intersecting both a conveyance direction in which the object is conveyed by a conveyance unit and a radiation direction in which X-rays are radiated by an X-ray radiation unit. In this case, sensitivity may be reduced in the connecting portion between the direct conversion-type X-ray detection element arrays next to each other. Once sensitivity is reduced in the connecting portion between the direct conversion-type X-ray detection element arrays next to each other, a line on which luminance is reduced along a direction corresponding to the conveyance direction appears in the region that corresponds to the connecting portion in the image of the object in an X-ray transmission image (hereinafter, the line will be referred to as a "luminance reduction line").

Means for canceling the influence of the luminance reduction line in the X-ray transmission image include linear correction processing (calibration processing) for equalizing the luminance of the background in an X-ray transmission image acquired in a state where an object to be inspected is not conveyed. However, the X-ray absorption characteristics of the object are not strictly linear, and thus, in a case where a thick object such as meat is an inspection target, the influence of the luminance reduction line is unlikely to be canceled in the X-ray transmission image simply by the linear correction processing being carried out.

An object of the present disclosure is to provide an X-ray inspection apparatus that can accurately detect a foreign matter by using a plurality of direct conversion-type X-ray detection element arrays even in a case where a thick object is an inspection target.

Solution to Problem

An X-ray inspection apparatus according to one embodiment of the present disclosure includes a conveyance unit configured to convey an object to be inspected, an X-ray radiation unit configured to radiate X-rays to the object conveyed by the conveyance unit an X-ray detection unit configured to detect the X-rays radiated to the object conveyed by the conveyance unit, and an image processing unit configured to generate an X-ray transmission image of the object based on a detection signal output from the X-ray detection unit and carry out image processing on the X-ray transmission image, in which the X-ray detection unit includes a plurality of direct conversion-type X-ray detection element arrays disposed side-by-side in rows along a direction intersecting both a conveyance direction in which the object is conveyed by the conveyance unit and a radiation direction in which the X-rays are radiated by the X-ray radiation unit and configured to convert X-rays of a first energy band into electric charge, and the image processing unit includes an edge detection unit configured to carry out edge detection processing on the X-ray transmission image to generate an edge detected image, a horizontal direction gradation unit configured to carry out horizontal direction gradation processing along the conveyance direction on the edge detected image to generate a horizontal direction gradation image, and a synthesizing unit configured to synthesize the X-ray transmission image and the horizontal direction gradation image to generate a post-processing X-ray transmission image.

In the X-ray inspection apparatus, the plurality of direct conversion-type X-ray detection element arrays configured to convert the X-rays of the first energy band into electric charge are used, and the image processing unit generates the edge detected image by carrying out the edge detection processing on the X-ray transmission image, generates the horizontal direction gradation image by carrying out the horizontal direction gradation processing on the edge detected image, and generates the post-processing X-ray transmission image by synthesizing the X-ray transmission image and the horizontal direction gradation image. As a result, a luminance reduction line appearing due to sensitivity reduction in a connecting portion between the direct conversion-type X-ray detection element arrays next to each other can be removed in the post-processing X-ray transmission image. Accordingly, the X-ray inspection apparatus can accurately detect a foreign matter by using the plurality of direct conversion-type X-ray detection element arrays even in a case where a thick object is an inspection target.

In the X-ray inspection apparatus according to one embodiment of the present disclosure, the X-rays of the first energy band may be soft X-rays. As a result, a foreign matter formed of a material unlikely to absorb hard X-rays and likely to absorb soft X-rays (for example, a nonmetal such as glass and rubber, and a light metal such as aluminum) can be accurately detected.

In the X-ray inspection apparatus according to one embodiment of the present disclosure, the X-ray detection unit may further include a plurality of indirect conversion-type X-ray detection element arrays disposed side-by-side in rows along the direction intersecting both the conveyance direction in which the object is conveyed by the conveyance unit and the radiation direction in which the X-rays are radiated by the X-ray radiation unit and configured to convert X-rays of a second energy band larger than the first energy band into light and convert the light into electric charge, and the image processing unit may generate the post-processing X-ray transmission image by using, as the X-ray transmission image, a first X-ray transmission image of the object generated based on a first detection signal output from the direct conversion-type X-ray detection element arrays and may synthesize the post-processing X-ray transmission image and a second X-ray transmission image of the object generated based on a second detection signal output from the indirect conversion-type X-ray detection element arrays.

In the X-ray inspection apparatus according to one embodiment of the present disclosure, the X-ray detection unit may further include a plurality of indirect conversion-type X-ray detection element arrays disposed side-by-side in rows along the direction intersecting both the conveyance direction in which the object is conveyed by the conveyance unit and the radiation direction in which the X-rays are radiated by the X-ray radiation unit and configured to convert X-rays of a second energy band larger than the first energy band into light and convert the light into electric charge, and the image processing unit may synthesize a first X-ray transmission image of the object generated based on a first detection signal output from the direct conversion-type X-ray detection element arrays and a second X-ray transmission image of the object generated based on a second detection signal output from the indirect conversion-type X-ray detection element arrays to generate a synthetic X-ray transmission image and may generate the post-processing X-ray transmission image by using the synthetic X-ray transmission image as the X-ray transmission image.

In this manner, the foreign matter can be more accurately detected by using the indirect conversion-type X-ray detection element arrays configured to convert the X-rays of the second energy band larger than the first energy band into light and convert the light into electric charge, and the direct conversion-type X-ray detection element arrays together.

In the X-ray inspection apparatus according to one embodiment of the present disclosure, the X-rays of the second energy band may be hard X-rays. The foreign matter formed of a material unlikely to absorb hard X-rays and likely to absorb soft X-rays (for example, a nonmetal such as glass and rubber, and a light metal such as aluminum) can be more accurately detected by using the X-ray transmission image of the object based on hard X-rays.

Advantageous Effects of Invention

According to the present disclosure, it is possible to provide an X-ray inspection apparatus that can accurately detect a foreign matter by using a plurality of direct conversion-type X-ray detection element arrays even in a case where a thick object is an inspection target.

DESCRIPTION OF EMBODIMENTS

Figure 1:
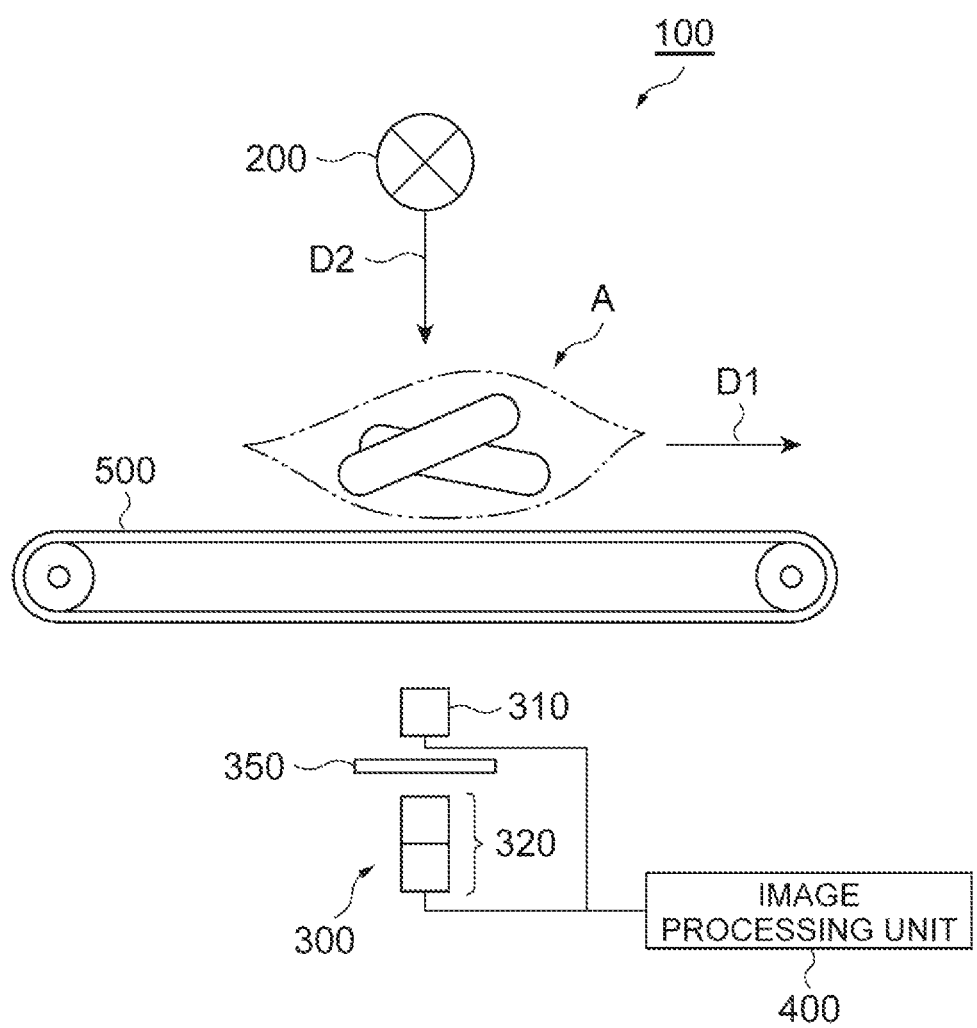
FIG. 1 is a configuration diagram of an X-ray inspection apparatus according to an embodiment.

Hereafter, an embodiment of the present disclosure will be described in detail with reference to accompanying drawings. In each of the drawings, the same reference numerals will be used to refer to the same or equivalent parts so that duplicate description is omitted.

As illustrated in FIG. 1, an X-ray inspection apparatus 100 includes a conveyance unit 500, an X-ray radiation unit 200, an X-ray detection unit 300, and an image processing unit 400. The X-ray inspection apparatus 100 detects foreign matters included in an object to be inspected A (such as a plurality of bagged sausages) by using the transparency of X-rays.

[Conveyance Unit]

The conveyance unit 500 conveys the object A. Various conveyance mechanisms such as a belt conveyor, a top chain conveyor, and a rotary table can be applied to the conveyance unit 500.

[X-ray Emission Unit]

The X-ray radiation unit 200 radiates X-rays to the object A conveyed by the conveyance unit 500. The X-rays radiated from the X-ray radiation unit 200 include soft X-rays (X-rays of a first energy band) and hard X-rays (X-rays of a second energy band).

[X-ray Detection Unit]

The X-ray detection unit 300 detects the X-rays radiated to the object A conveyed by the conveyance unit 500. The X-ray detection unit 300 includes a direct conversion-type X-ray detector 310, an indirect conversion-type X-ray detector 320, and a filter 350. The direct conversion-type X-ray detector 310 is disposed to face the X-ray radiation unit 200 across the conveyance unit 500 and detects the soft X-rays. The indirect conversion-type X-ray detector 320 is disposed to face the X-ray radiation unit 200 across the conveyance unit 500 and the direct conversion-type X-ray detector 310 and detects the hard X-rays. The filter 350 is disposed between the direct conversion-type X-ray detector 310 and the indirect conversion-type X-ray detector 320 and absorbs X-rays of an energy band between the soft X-rays and the hard X-rays.

Figure 2:
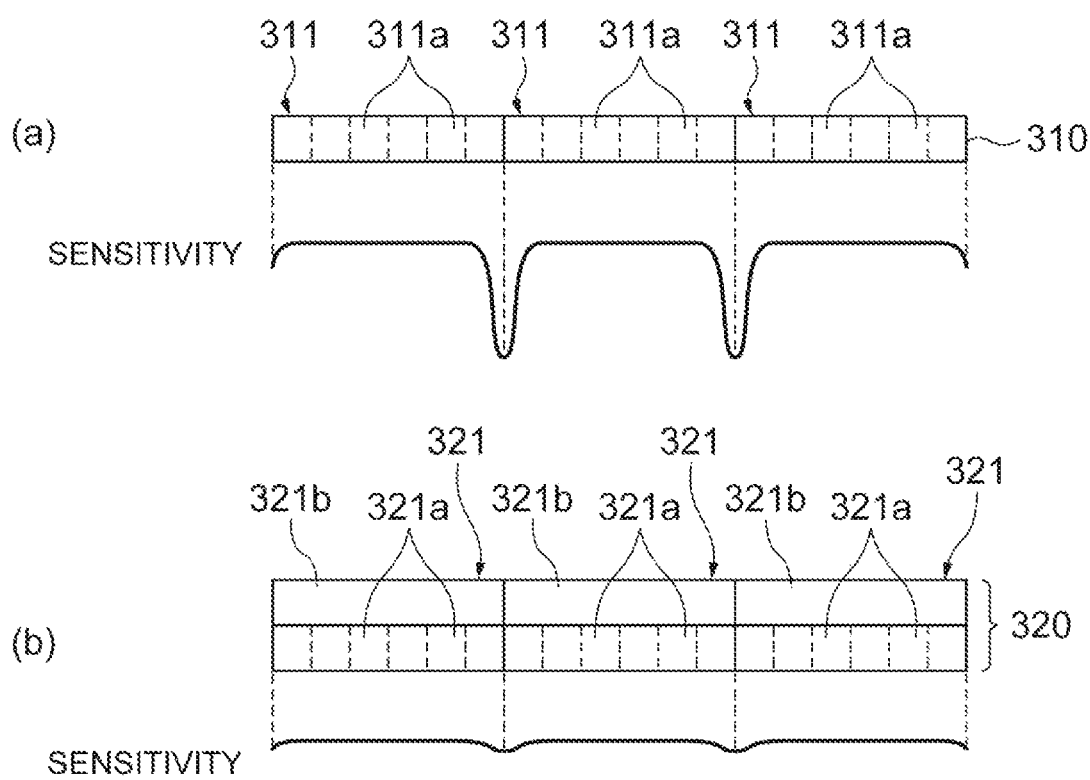
FIG. 2(a) is a diagram illustrating a relationship between a direct conversion-type X-ray detection unit and sensitivity.
FIG. 2(b) is a diagram illustrating a relationship between an indirect conversion-type X-ray detection unit and sensitivity.

As illustrated in FIG. 2(a), the direct conversion-type X-ray detector 310 has a plurality of direct conversion-type X-ray detection element arrays 311. Each of direct conversion-type X-ray detection element arrays 311 is a line sensor including a plurality of direct conversion-type X-ray detection elements 311a arranged in one dimension. In each of the direct conversion-type X-ray detection element arrays 311, the soft X-rays are converted into electric charge by each of the direct conversion-type X-ray detection elements 311a that is a photodiode. The plurality of direct conversion-type X-ray detection element arrays 311 are disposed side-by-side in rows such that the plurality of direct conversion-type X-ray detection elements 311a are arranged in one dimension along (refer to FIG. 1) a direction intersecting both a conveyance direction D1 in which the object A is conveyed by the conveyance unit 500 and a radiation direction D2 in which the X-rays are radiated by the X-ray radiation unit 200 (that is, directions in which the X-ray radiation unit 200 and the X-ray detection unit 300 face each other) (direction orthogonal to both directions in the X-ray inspection apparatus 100).

As illustrated in FIG. 2(b), the indirect conversion-type X-ray detector 320 has a plurality of indirect conversion-type X-ray detection element arrays 321. Each of indirect conversion-type X-ray detection element arrays 321 is a line sensor including a plurality of indirect conversion-type X-ray detection elements 321a arranged in one dimension and a plurality of scintillator layers 321b disposed on the X-ray radiation unit 200 side with respect to the plurality of indirect conversion-type X-ray detection elements 321a. In each of the indirect conversion-type X-ray detection element arrays 321, the hard X-rays are converted into light by the scintillator layers 321b and the light is converted into electric charge by each of the indirect conversion-type X-ray detection elements 321a that is a photodiode. The plurality of indirect conversion-type X-ray detection element arrays 321 are disposed side-by-side to rows such that the plurality of indirect conversion-type X-ray detection elements 321a are arranged in one dimension along (refer to FIG. 1) the direction intersecting both the conveyance direction D1 and the radiation direction D2 (direction orthogonal to both directions in the X-ray inspection apparatus 100).

In the direct conversion-type X-ray detection element array 311, sensitivity is relatively reduced in the direct conversion-type X-ray detection elements 311a positioned at both ends for manufacturing reasons. Accordingly, in the direct conversion-type X-ray detector 310, sensitivity is relatively reduced especially in connecting portions between the direct conversion-type X-ray detection element arrays 311 next to each other as illustrated in FIG. 2(a). Likewise, in the indirect conversion-type X-ray detection element array 321, sensitivity is relatively reduced in the indirect conversion-type X-ray detection elements 321a positioned at both ends for manufacturing reasons. However, as illustrated in FIG. 2(b), in the indirect conversion-type X-ray defector 320, relative sensitivity reduction in connecting portions between the indirect conversion-type X-ray detection element arrays 321 next to each other is hardly problematic because, for example, light comes and goes between the scintillator layers 321b next to each other.

[Image Processing Unit]

Figure 3:
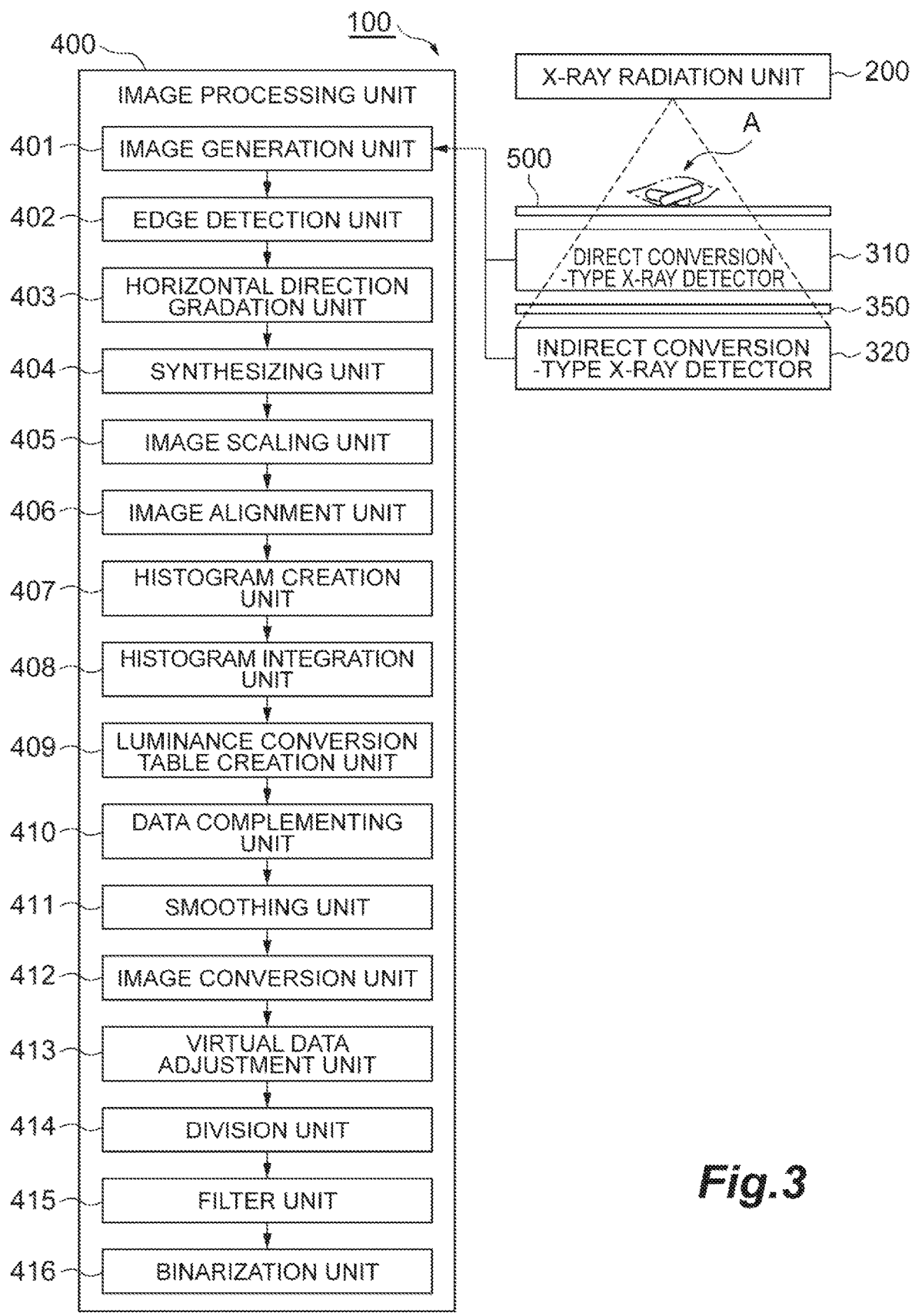
FIG. 3 is a block diagram of the X-ray inspection apparatus illustrated in FIG. 1.

As illustrated in FIG. 3, the image processing unit 400 generates an X-ray transmission image of the object A based on a detection signal output from the X-ray detection unit 300 and carries out image processing on the X-ray transmission image. The image processing unit 400 has an image generation unit 401, an edge detection unit 402, a horizontal direction gradation unit 403, a synthesizing unit 404, an image scaling unit 405, an image alignment unit 406, a histogram creation unit 407, a histogram integration unit 408, a luminance conversion table creation unit 409, a data complementing unit 410, a smoothing unit 411, an image conversion mil 412, a virtual data adjustment unit 413, a division unit 414, a filter unit 415, and a binarization unit 416.

[Image Generation Unit]

Figure 4:
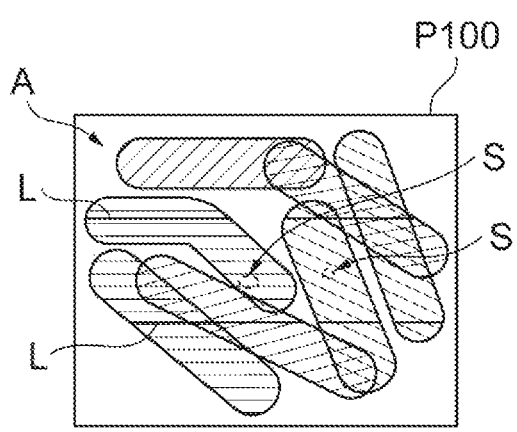
FIG. 4(a) is a diagram illustrating a soft X-ray transmission image.
FIG. 4(b) is a diagram illustrating a hard X-ray transmission image.
Figure 4:
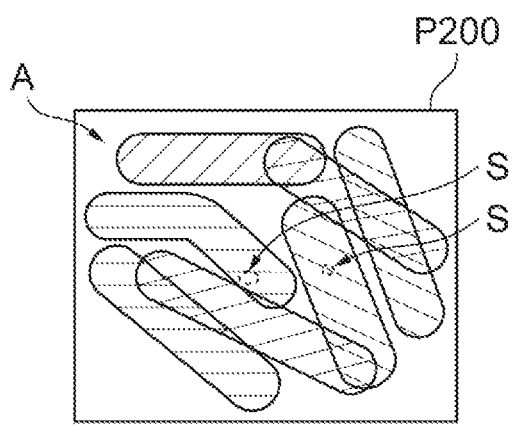

The linage generation unit 401 generates a soft X-ray transmission image (first X-ray transmission image) P100 of the object A based on a soft X-ray detection signal (first detection signal) output from each of the direct conversion-type X-ray detection element arrays 311 and generates a hard X-ray transmission image (second X-ray transmission image) P200 of the object A based on a hard X-ray detection signal (second detection signal) output from each of the indirect conversion-type X-ray detection element arrays 321. As illustrated in FIG. 4(a), the soft X-ray transmission image P100 is relatively high in contrast and is dark as a whole. In addition, as illustrated in FIG. 4(b), the hard X-ray transmission image P200 is relatively low in contrast and is bright as a whole. Furthermore, as illustrated in FIGS. 4(a) and 4(b), the contrast of a foreign matter S and the object A (non-overlapping region of the object A) in the hard X-ray transmission image P200 is smaller than the contrast of the foreign matter S and the object A (non-overlapping region of the object A) in the soft X-ray transmission image P100. This is because the X-ray absorption rates of the foreign matter S and the object A differ from each other.

As described above, in the direct conversion-type X-ray detector 310, sensitivity is reduced especially in the connecting portion between the direct conversion-type X-ray detection element arrays 311 next to each other. Accordingly, as illustrated in FIG. 4(a), a line on which luminance is reduced along a direction corresponding to the conveyance direction D1, that is, a luminance reduction line L appears in the region that corresponds to the connecting portion in the image of the object A in the soft X-ray transmission image P100. In order to cancel the influences of the luminance reduction line L in the soft X-ray transmission image P100. The image generation unit 401 carries out linear correction processing for equalizing the luminance of the background in the X-ray transmission image acquired in a state where the object A is not conveyed. However, the X-ray absolution characteristics of the object A are not strictly linear, and thus, when a thick object A such as meat is an inspection target, the influence of the luminance reduction line L cannot be canceled in the soft X-ray transmission image P100 simply by the image generation trait 401 carrying out the linear correction processing. In this regard, the influence of the luminance reduction line L is canceled in the soft X-ray transmission image P100 by the edge detection unit 402, the horizontal direction gradation unit 403, and the synthesizing unit 404, which will be described below.

[Edge Detection Unit]

Figure 5:
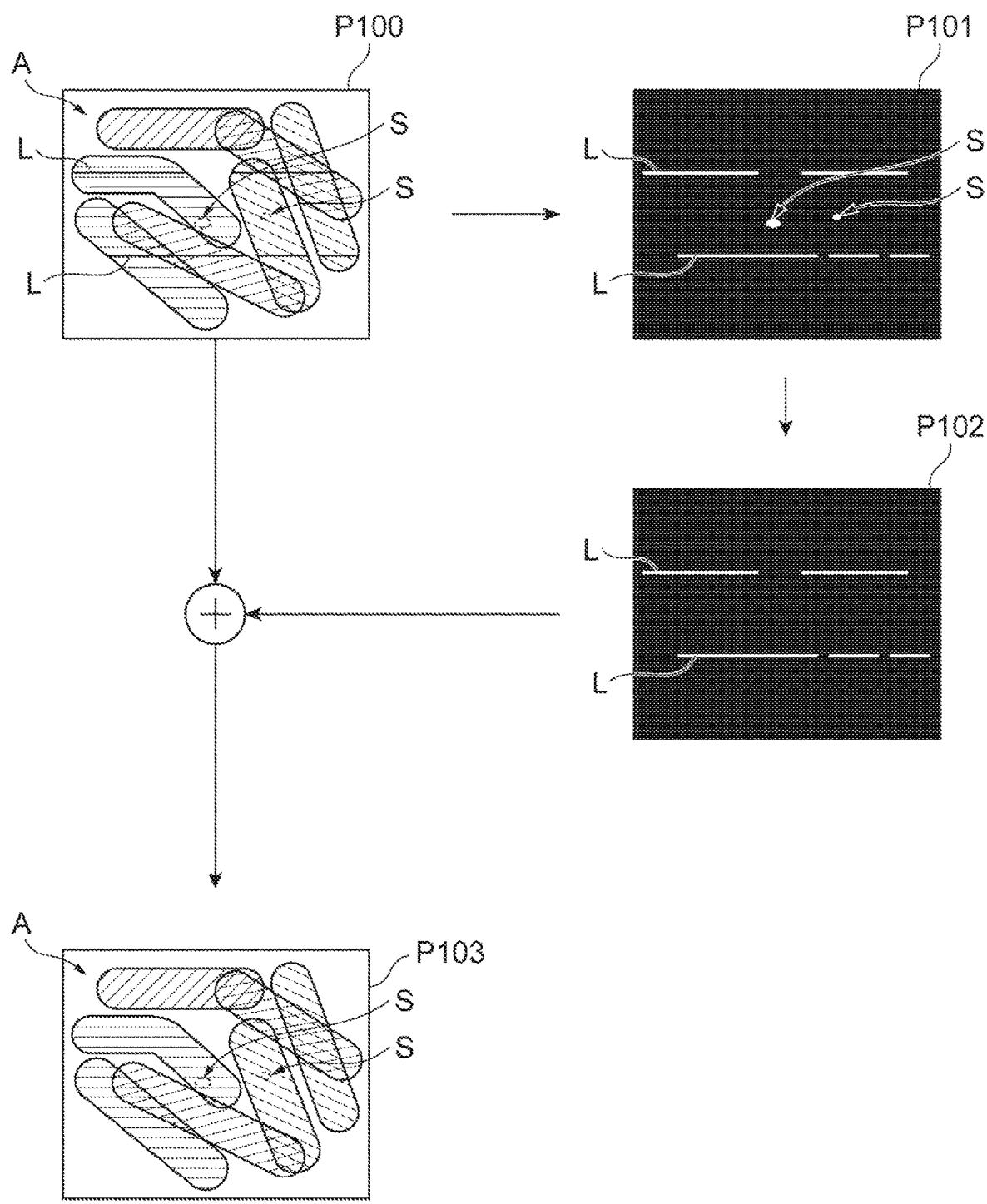
FIG. 5 is a diagram illustrating a processing procedure for generating a post-processing soft X-ray transmission image.

As illustrated in FIG. 5, the edge detection unit 402 generates an edge detected image P101 by carrying out edge detection processing on the soft X-ray transmission image P100. More specifically, the edge detection unit 402 generates the edge detected image P101 by carrying out linear correction processing for equalizing the luminance of the image of the object A and the luminance of the background on the soft X-ray transmission image P100, carrying out the edge detection processing on the soft X-ray transmission image P100, and carrying out binarization processing and inversion processing on the soft X-ray transmission image P100. A Laplacian filter, a Sobel filter, or the like is used for the edge detection processing. As a result, in the edge detected image P101, the edge of the object A is removed and the edge of the foreign matter S inverted to white and the luminance reduction line L remain.

[Horizontal Direction Gradation Unit]

As illustrated in FIG. 5, the horizontal direction gradation unit 403 generates a horizontal direction gradation image P102 by carrying out horizontal direction gradation processing along the conveyance direction D1 on the edge detected image P101. The horizontal direction gradation processing along the conveyance direction D1 is, for example, processing in which a pixel region that has the direction in which the luminance reduction line L extends (that is, a direction corresponding to the conveyance direction D1) as a longitudinal direction is set with respect to one pixel constituting the edge detected image P101 such that the pixel region includes the one pixel, and the average value of the luminance values in the pixel region is regarded as the luminance value of the one pixel, and the horizontal direction gradation processing along the conveyance direction D1 is earned out for each pixel with respect to every pixel constituting the edge detected image P101. The horizontal direction gradation processing is step removal processing. A horizontal direction blur filter, a horizontal direction Gaussian filter, or the like is used for the horizontal direction gradation processing. As a result, in the horizontal direction gradation image P102, the edge of the foreign matter S is removed and the luminance reduction line L inverted to white remains.

[Synthesizing Unit]

As illustrated in FIG. 5, the synthesizing unit 404 generates a post-processing soft X-ray transmission image (post-processing X-ray transmission image) P103 by synthesizing the soft X-ray transmission image P100 and the horizontal direction gradation image P102. More specifically, the synthesizing unit 404 generates the post-processing soft X-ray transmission image P103 by adding up the luminance value of every pixel constituting the soft X-ray transmission image P100 and the luminance value of every pixel constituting the horizontal direction gradation image P102 between corresponding pixels. As a result, the post-processing soft X-ray transmission image P103 from which the luminance reduction line L is removed is obtained.

[Image Scaling Unit]

Figure 6:
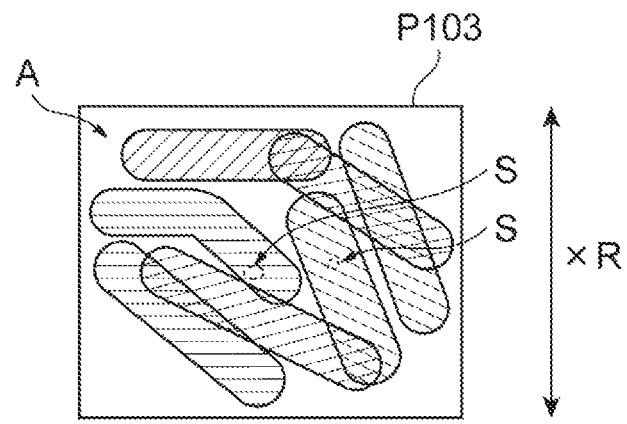
FIG. 6 is a diagram illustrating an enlarged post-processing soft X-ray transmission image.

The image scaling unit 405 adjusts the sizes of the object A in the post-processing soft X-ray transmission image P103 and the object A in the hard X-ray transmission image P200. The X-rays radiated from the X-ray radiation unit 200 are radiated in a fan shape and the distance from the X-ray radiation unit 200 to the direct conversion-type X-ray detector 310 and the distance from the X-ray radiation unit 200 to the indirect conversion-type X-ray detector 320 differ from each other, and thus the object A in the post-processing soft X-ray transmission image P103 and the object A in the hard X-ray transmission image P200 have different sizes. In other words, the object A in the hard X-ray transmission image P200 is slightly larger than the object A in the post-processing soft X-ray transmission image P103. In this regard, the image scaling unit 405 enlarges the post-processing soft X-ray transmission image P103 in the line sensor arrangement direction by a conversion ratio R as illustrated in FIG. 6. The conversion ratio R is L2/L1, in which L1 is the distance from the X-ray radiation unit 200 to the direct conversion-type X-ray detector 310 and L2 is the distance from the X-ray radiation unit 200 to the indirect conversion-type X-ray detector 320. Although the post-processing soft X-ray transmission image P103 is enlarged in the example described above, it is a matter of course that the hard X-ray transmission image P200 may also be shrunk in the ratio of the reciprocal of R (1/R).

[Image Alignment Unit]

Figure 7:
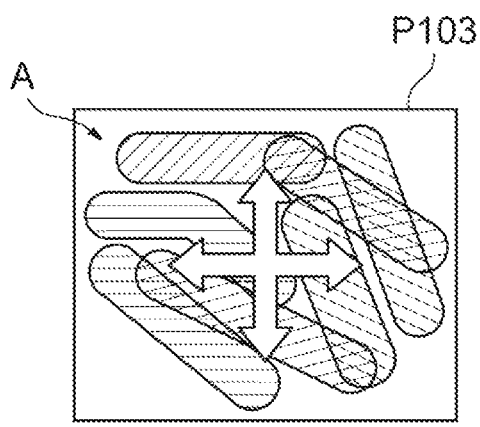
FIG. 7 is a diagram illustrating an aligned post-processing soft X-ray transmission image.
Figure 8:
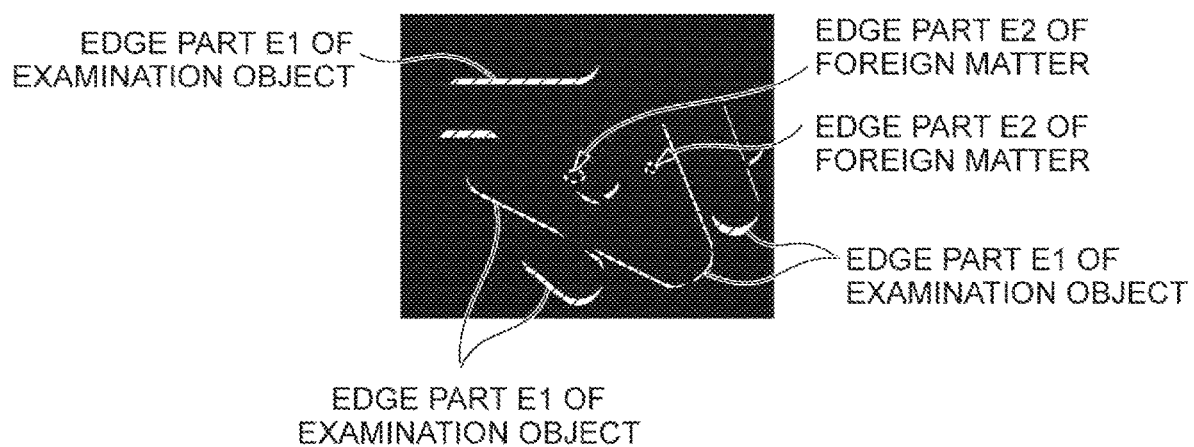
FIG. 8(a) is a diagram illustrating an image in which the post-processing soft X-ray transmission image and the hard X-ray transmission image are superimposed
FIG. 8(b) is a diagram illustrating an image in which the post-processing soft X-ray transmission image and the hard X-ray transmission image are further aligned.
Figure 8:
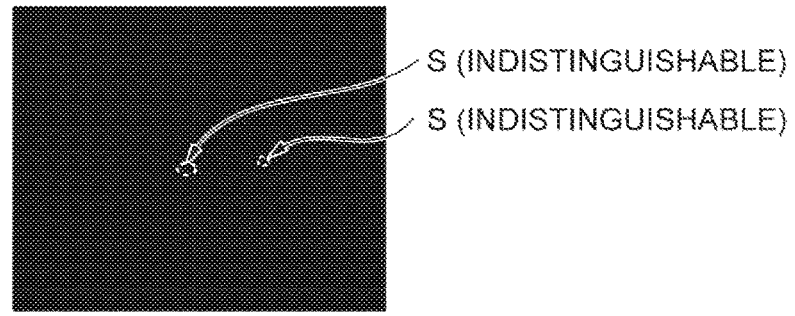

The image alignment unit 406 aligns the positions of the object A in the post-processing soft X-ray transmission image P103 and the object A in the bard X-ray transmission image P200. Specifically, the image alignment unit 406 minimizes the difference between the post-processing soil X-ray transmission image P103 and the hard X-ray transmission image P200 by moving the post-processing soft X-ray transmission image P103 upward, downward, leftward, and rightward as illustrated in FIG 7. The image alignment unit 406 according to the present embodiment superimposes both images, calculates the sum total of the average value of the luminance value difference between both images in each pixel, and automatically performs the alignment such that the sum total is minimized. As illustrated in FIG. 8(a), an edge part E1 of the object A and an edge part E2 of the foreign matter S appear before the alignment by the image alignment unit 406. Whether the edge part on the image is the edge part E1 of the object A or the edge part E2 of the foreign matter S is indistinguishable. Misalignment of the object A and the foreign matter S is eliminated and an almost black and almost monochromatic image is obtained, as illustrated in FIG. 8(b), after the alignment by the image alignment unit 406.

As is illustrated in the aligned image in FIG. 8(b), the region of the foreign matter S also becomes almost black and almost monochromatic and the foreign matter S cannot be distinguished simply by the enlargement and alignment of the post-processing soft X-ray transmission image P103. In this regard, the soft X-ray transmission image P100 is processed by the histogram creation unit 407, the histogram integration unit 408, the luminance conversion table creation unit 409, the data complementing unit 410, the smoothing unit 411, the image conversion unit 412, the virtual data adjustment unit 413, the division unit 414, the filter unit 415, and the binarization unit 416, which will be described below, so that the foreign matter S can be distinguished.
[Histogram Creation Unit]

Figure 9:
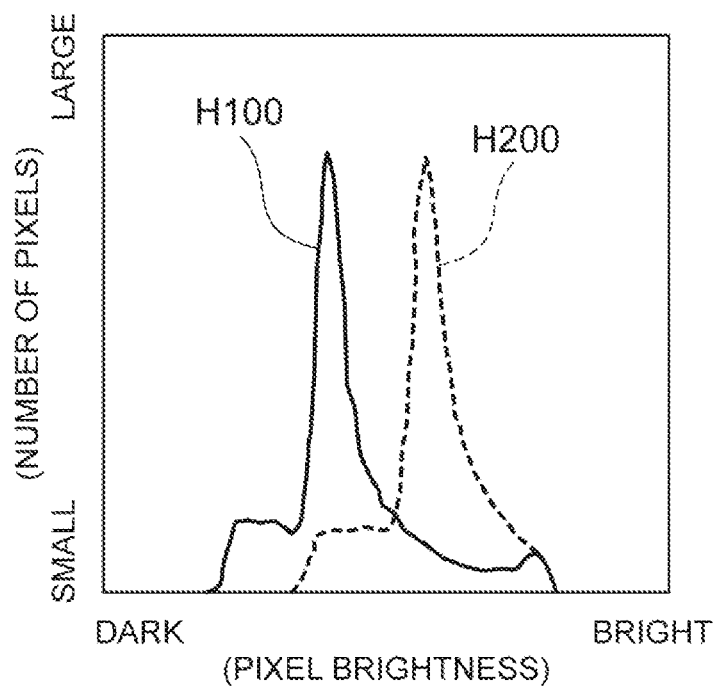
FIG. 9 is a diagram illustrating a luminance histogram of the post-processing soft X-ray transmission image and the hard X-ray transmission image.

The histogram creation unit 407 creates a soft X-ray luminance histogram H100 illustrating the luminance distribution of the post-processing soft X-ray transmission image P103 and creates a hard X-ray luminance histogram H200 illustrating the luminance distribution of the hard X-ray transmission image P200. As described above, the post-processing soft X-ray transmission image P103 is darker as a whole than the hard X-ray transmission image P200. Accordingly, as illustrated in FIG. 9, the soft X-ray luminance histogram H100 is closer to the left side in the drawing (high pixel brightness side) than the hard X-ray luminance histogram H200.
[Histogram integration Unit]

Figure 10:
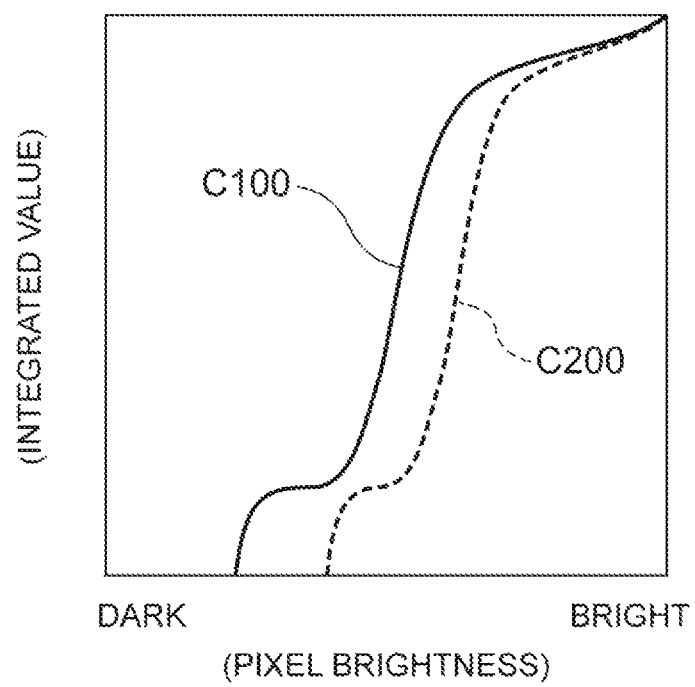
FIG. 10 is a diagram illustrating luminance histogram integration curves of the post-processing soft X-ray transmission image and the hard X-ray transmission image.

As illustrated in FIG. 10, the histogram integration unit 408 calculates a sot X-ray luminance histogram integration curve C100 by integrating the soft X-ray luminance histogram H100 described above and calculates a hard X-ray luminance histogram integration curve C200 by integrating the hard X-ray luminance histogram H200.
[Luminance Conversion Table Creation Unit]

Figure 11:
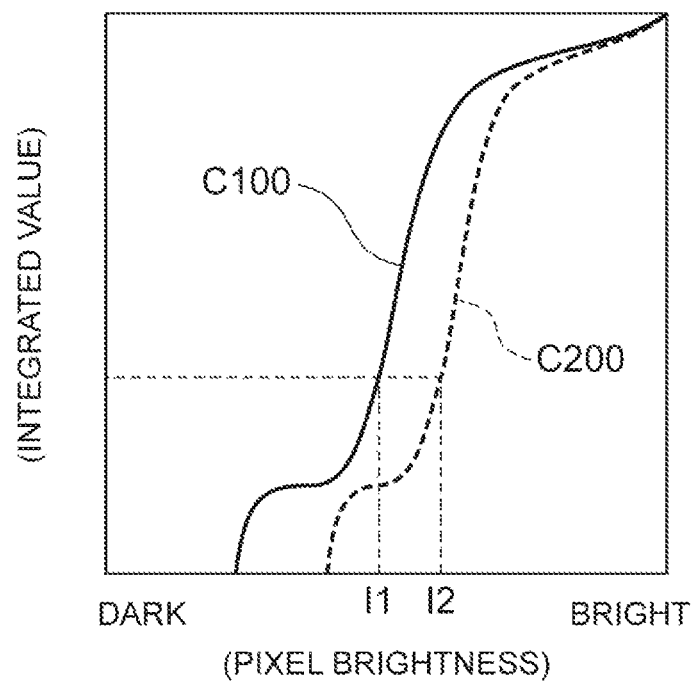
FIG. 11 is a diagram illustrating the luminance histogram integration curves of the post-processing soft X-ray transmission image and the hard X-ray transmission image.

The luminance conversion table creation unit 409 creates a luminance conversion table T100 for matching or approximating the soft X-ray luminance histogram integration curve C100 to the hard X-ray luminance histogram integration curve C200 by comparing the soft X-ray luminance histogram integration curve C100 and the hard X-ray luminance histogram integration curve C200 to each other. Specifically, as illustrated in FIG. 11, the luminance conversion table creation unit 409 obtains the luminance conversion table T100 illustrated in FIG. 12 by obtaining, at each luminance, a conversion ratio I (=I1/I2) of the luminance at which an integrated value I1 of the soft X-ray luminance histogram integration curve C100 is equal to an integrated value I2 of the hard X-ray luminance histogram integration curve.
[Data Complementing Unit]

Figure 12:
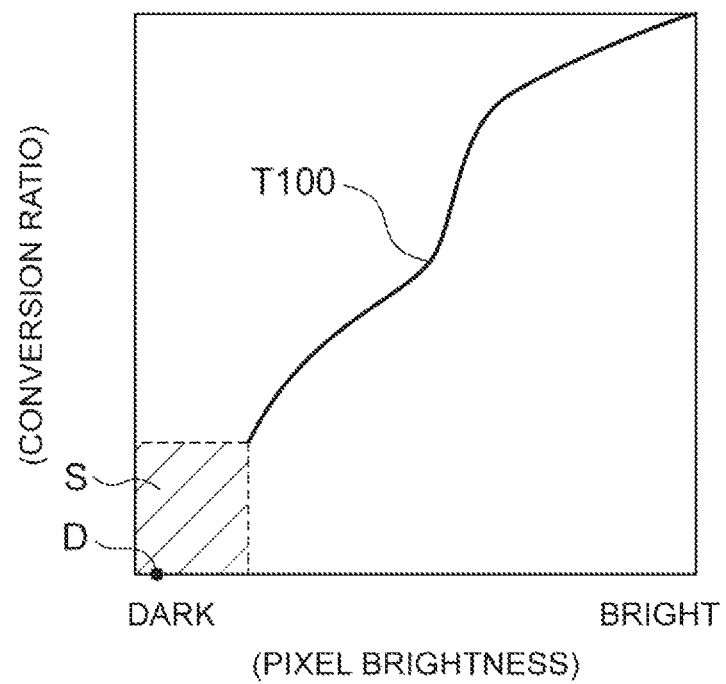
FIG. 12 is a diagram illustrating a luminance conversion table.

The conversion ratio I of the luminance value cannot be obtained in a case where the post-processing soft X-ray transmission image PIGS and the hard X-ray transmission image P200 have no low-luminance value pixel (dark pixel). Accordingly, as illustrated in FIG. 12, a low-luminance value region S of the luminance conversion table T100 created by the luminance conversion table creation unit 409 described above has no conversion data. In this case, luminance conversion cannot be performed with regard to low-luminance value pixels. In this regard, the data complementing unit 410 complements the luminance conversion table T100 described above by virtual conversion data D in the low-luminance value region S. The luminance conversion table complemented by the virtual conversion data D will be referred to as a "complemented luminance conversion table T100" below.
[Smoothing Unit]

Figure 13:
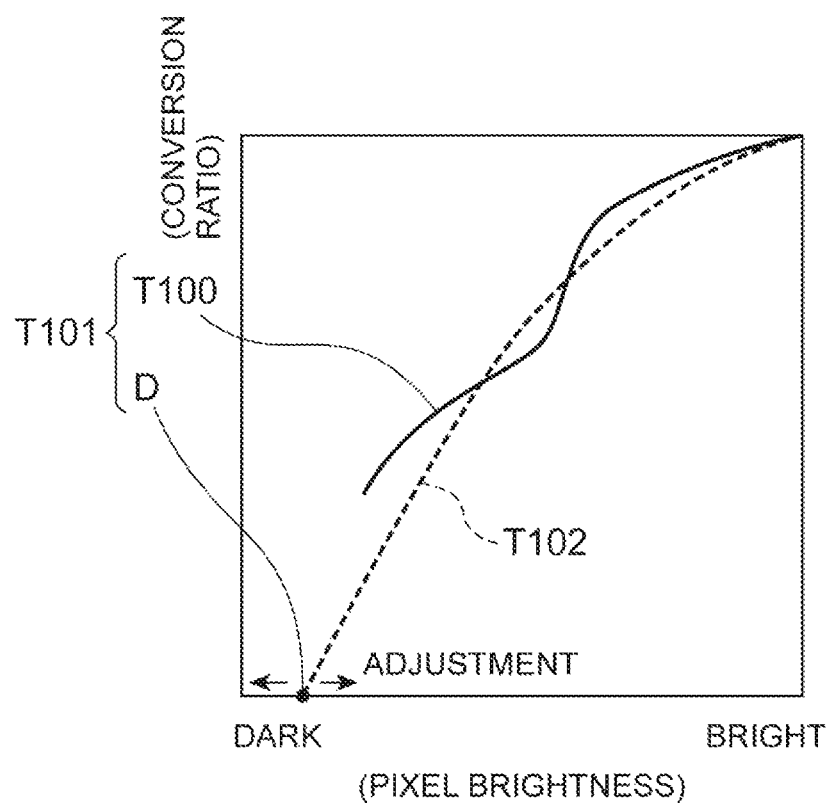
FIG. 13 is a diagram illustrating the luminance conversion table, a complemented luminance conversion table, and a complemented smooth luminance conversion table.

As illustrated in FIG. 13, the smoothing unit 411 smooths the complemented luminance conversion table T101. The complemented smooth luminance conversion table smoothed by the smoothing unit 411 will be referred to as a "complemented smooth luminance conversion table T102" below. In a case where the luminance distributions of the post-processing soft X-ray transmission image P103 and the hard X-ray transmission image P200 generated by the image generation unit 401 described above are narrow, for example, the pre-smoothing luminance conversion table T100 may not be smooth or may not be a curve. In this case, reasonable luminance conversion cannot be performed in a case where an object to be inspected A that differs in luminance distribution from the post-processing soft X-ray transmission image P103 and the hard X-ray transmission image P200 described above is targeted. Accordingly, the smoothing unit 411 acquires the complemented smooth luminance conversion table T102 that draws a smooth curve by smoothing the complemented luminance conversion table T101 in order to acquire a generalized luminance conversion table capable of responding to objects to be inspected A which have various luminance distributions. A sufficiently practical table can be acquired through approximation by a quadratic function according to an experiment result, and thus the smoothing unit 411 according to the present embodiment acquires the complemented smooth luminance conversion table T102 by approximating the complemented luminance conversion table T101 with a quadratic function.
[Image Conversion Unit]

Figure 14:
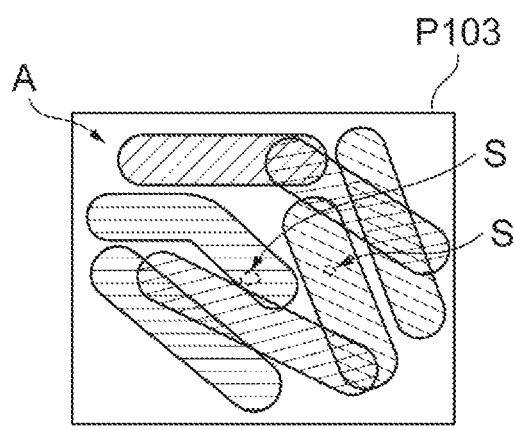
FIG. 14(a) is a diagram illustrating the post-processing soft X-ray transmission image.
FIG. 14(b) is a diagram illustrating a post-luminance conversion soft X-ray transmission image.
Figure 14:
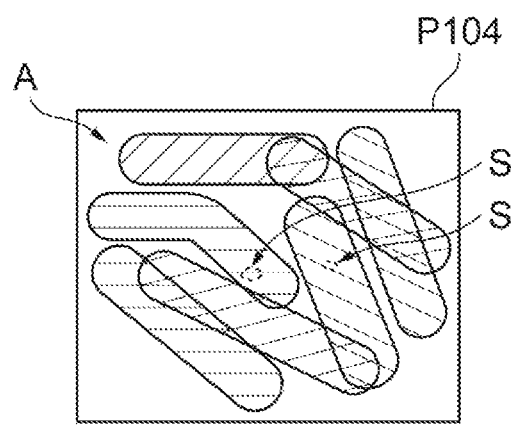

As illustrated in FIGS. 14(a) and 14(b), the image conversion unit 412 acquires a post-luminance conversion soli X-ray transmission image P104 by performing luminance conversion on the post-processing soft X-ray transmission image P103 based on the complemented smooth luminance conversion table T102.
[Virtual Data Adjustment Unit]

Figure 15:
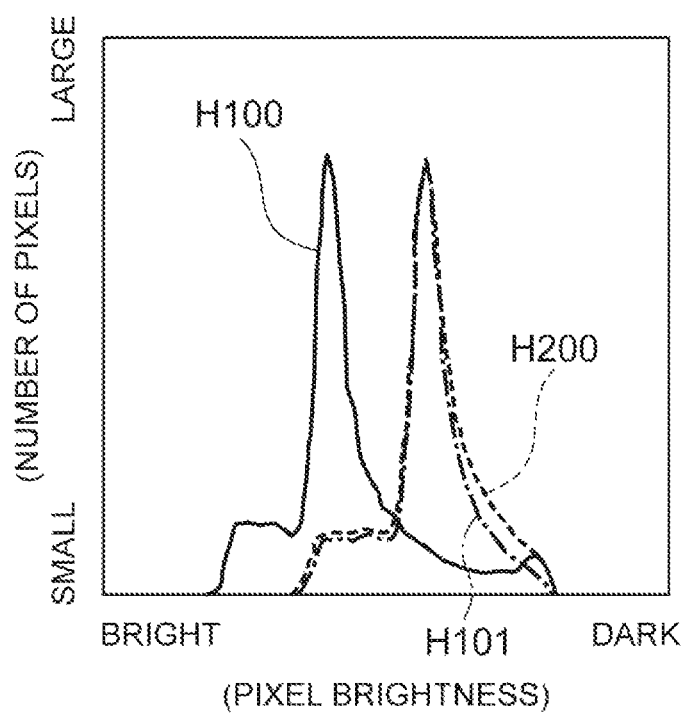
FIG. 15 is a diagram illustrating a luminance histogram of the post-processing soft X-ray transmission image, the hard X-ray transmission image, and the post-luminance conversion soft X-ray transmission image.

As illustrated in FIG. 15, a luminance histogram H101 of the post-luminance conversion soft X-ray transmission image P104 does not strictly correspond to the hard X-ray luminance histogram H200 of the hard X-ray transmission image P200. In this regard, the virtual data adjustment unit 413 adjusts the value of the virtual conversion data D used for the acquisition of the complemented smooth luminance conversion table T102 such that the sum total of the difference between each luminance value of the luminance distribution of the post-luminance conversion soft X-ray transmission image P104 and each luminance value of the luminance distribution of the hard X-ray transmission image P200 is minimized (least square method). As a result an optimized complemented smooth luminance conversion table T102 can be acquired, the luminance of the hard X-ray transmission image P200 is substantially equal to the luminance of the post-luminance conversion soft X-ray transmission image P104 luminance-converted by the table T102, and thus the object A can be erased. The optimized complemented smooth luminance conversion table T102 is stored in a storage unit (not illustrated) of the image processing unit 400.
[Division Unit]

Figure 16:
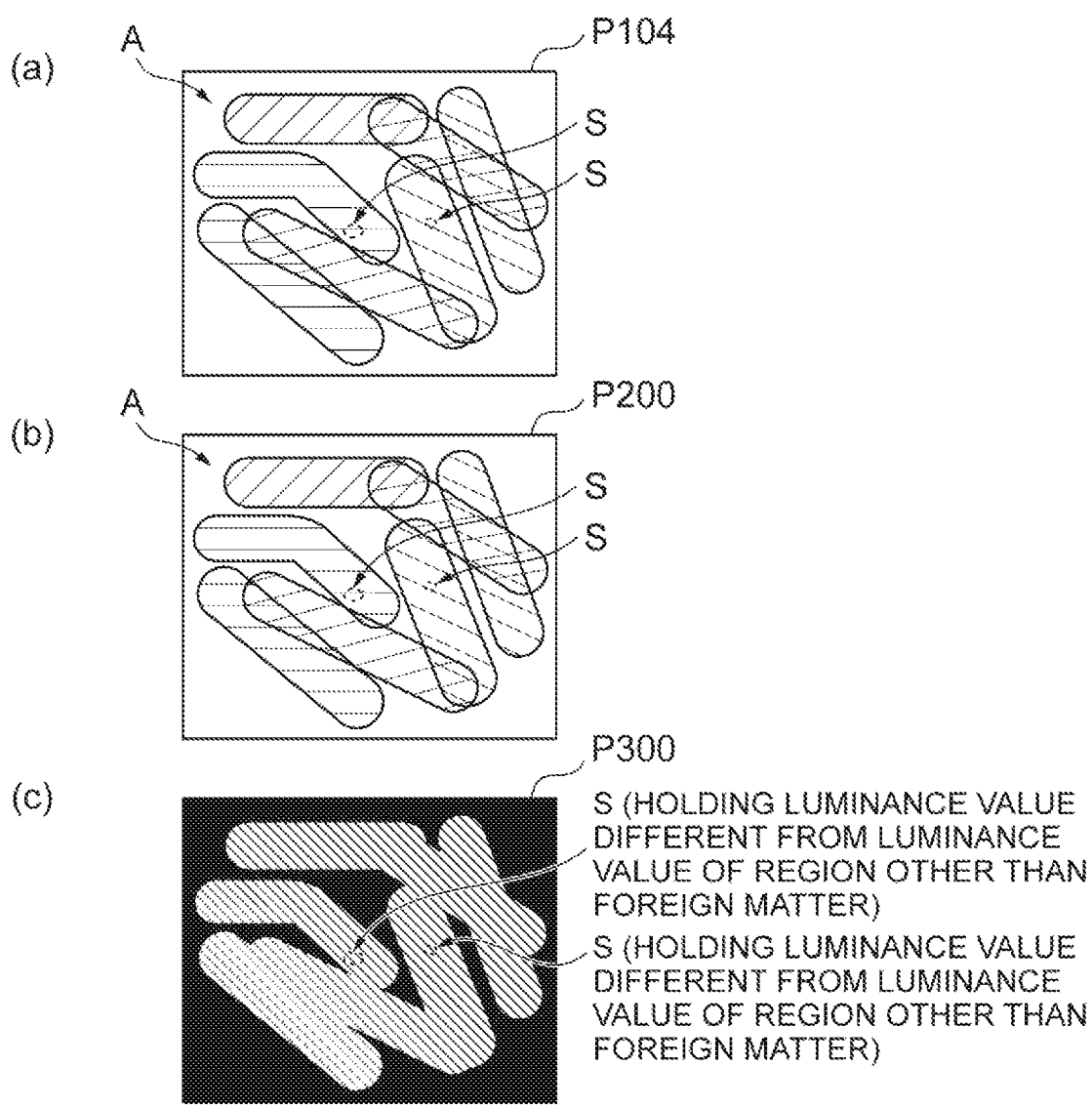
FIG. 16(a) is a diagram illustrating a luminance-converted post-processing soft X-ray transmission linage.
FIG. 16(b) is a diagram illustrating the hard X-ray transmission image.
FIG. 16(c) is a diagram illustrating a result image.

As illustrated in FIG. 16, the division unit 414 performs erasure of the object A by dividing, at each pixel, the luminance value of the post-luminance conversion soft X-ray transmission image P104 luminance-converted by the optimized complemented smooth luminance conversion table T102 (refer to FIG. 16(a)) and the luminance value of the hard X-ray transmission image P200 (refer to FIG. 16(b)). Although the erasure of the object A may be performed by the difference between the luminance value of each pixel of the post-luminance conversion soft X-ray transmission image P104 and the luminance value of each pixel of the hard X-ray transmission image P200 being obtained, the division unit 414 according to the present embodiment performs the erasure of the object A by performing the division because it is known from an experiment result that the object A can be more accurately erased by means of division. Nonetheless, most calculation results become 1 as a result of simple division because the image processing unit 400 is configured to be capable of holding only integers. For example, the calculation result becomes values such as 1.01, 1.11, and 1.21. Accordingly, the division unit 414 outputs a result image P300 (refer to FIG. 16(*c*)), in which the object A is erased, by multiplying the result of the division of the luminance values of both images by 100. On the result image P300, processing for offsetting the luminance value by 100 is performed after the processing by the filter unit 415 to be described below. As a result, the result image P300 in which the foreign matter S that holds a luminance value different from the luminance value of the region other than the foreign matter S appears can be acquired.

[Filter Unit]

Figure 17:
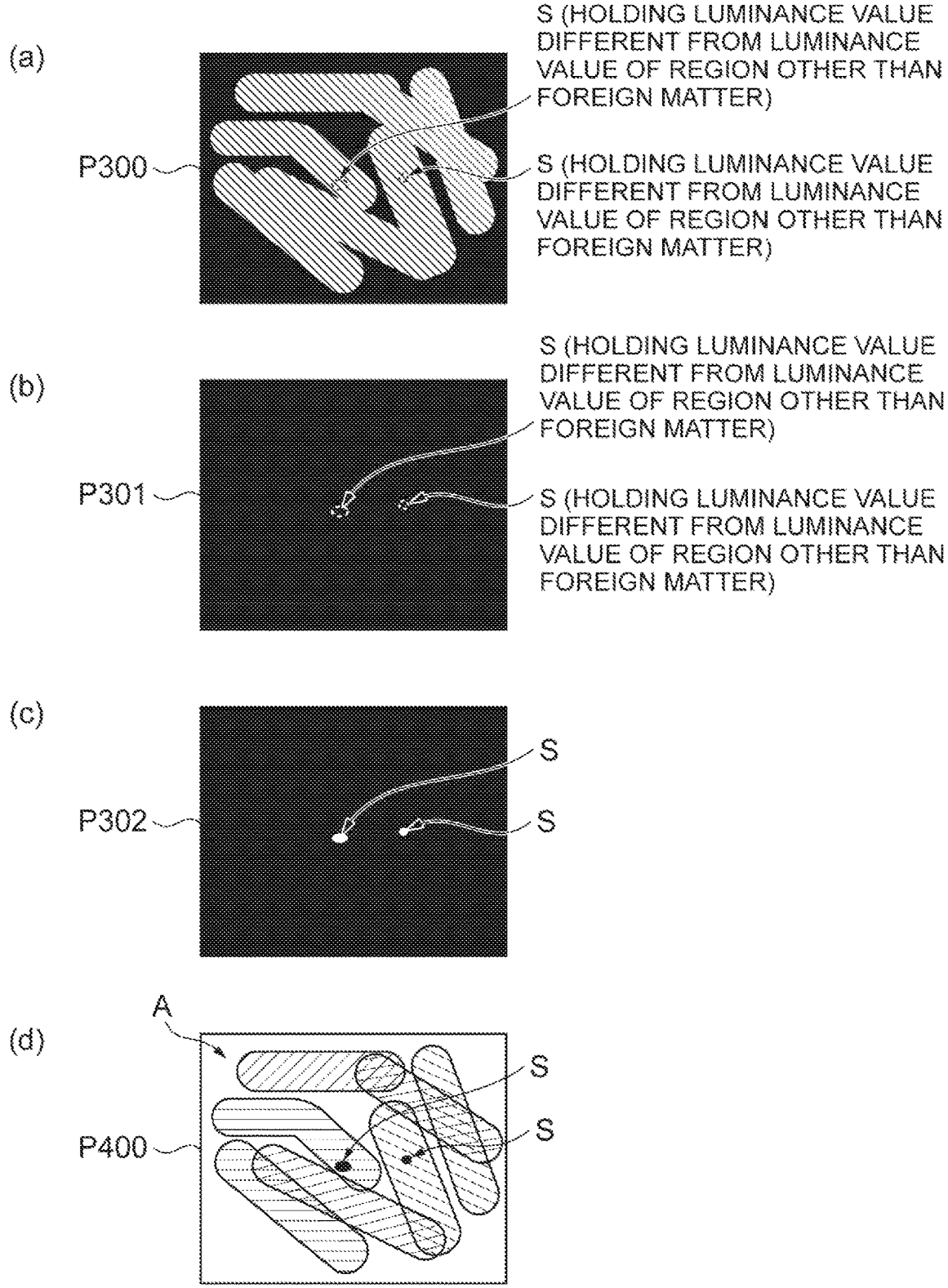
FIG. 17(a) is a diagram illustrating the result image.
FIG. 17(b) is a diagram illustrating a noise-removed image.
FIG. 17(c) is a diagram illustrating a binarized image.
FIG. 17(d) is a diagram illustrating a final image.

The filter unit 415 is disposed to remove the random noise that is included in the result image P300. Random noise is normally included in X-ray transmission images, and the random noise is also included in the result image P300 (refer to FIG. 17(*a*)) in which the object A is erased. In a case where the foreign matter S is included in the object A, the region of the X-ray transmission image where the foreign matter S is present has a value larger than noise, and thus the filter unit 415 according to the present embodiment removes fine noise by using a Gaussian filter and extracts the region where the foreign matter S is present by offsetting the luminance value by 100 as described above. As the number of integer value digits can be reduced, high-speed processing can be performed by a simple arithmetic processing unit. In addition, although a noise-removed image P301 (refer to FIG. 17(*b*)) from which the noise is removed by the filter unit 415 is dark as a whole (almost black and almost monochromatic), the region of the foreign matter S actually holds a data value different from the data value of the (almost black and almost monochromatic) region other than the foreign matter S.

[Binarization Unit]

The noise-removed image P301 from which the noise is removed by the filter unit 415 is binarized based on a constant threshold value by the binarization unit 416. As a result, a binarized image P302 (refer to FIG. 17(*c*)) from which only the foreign matter S is extracted can be acquired. Subsequently, the image processing unit 400 creates a final image P400 (refer to FIG. 17(*d*)) by superimposing the binarized image P302 and the hard X-ray transmission image P200. Although the binarized image P302 and the hard X-ray transmission image P200 are superimposed in the present embodiment, it is a matter of course that the binarized image P302 and the soft X-ray transmission image P100 may be superimposed instead.

[Method for Image Processing by Image Processing Unit]

Firstly, the image generation unit 401 generates the soft X-ray transmission image P100 of the object A based on the soft X-ray detection signal output from each of the direct conversion-type X-ray detection element arrays 311 and generates the hard X-ray transmission image P200 of the object A based on the hard X-ray detection signal output from each of the indirect conversion-type X-ray detection element arrays 321. Then, the edge detection unit 402 generates the edge detected image P101 by carrying out the edge detection processing on the soft X-ray transmission image P100. Then, the horizontal direction gradation unit 403 generates the horizontal direction gradation image P102 by carrying out the horizontal direction gradation processing on the edge detected image P101. Then, the synthesizing unit 404 generates the post-processing soft X-ray transmission image P103 by synthesizing the soft X-ray transmission image and the horizontal direction gradation image P102.

Then, the image scaling unit 405 adjusts the sizes of the object A in the post-processing soft X-ray transmission image P103 and the object A in the hard X-ray transmission image P200. Then, the image alignment unit 406 aligns the positions of the object A in the post-processing soft X-ray transmission image P103 and the object A in the hard X-ray transmission image P200. The image enlargement and the image movement can be realized by affine transformation. Then, the image conversion unit 412 generates the post-luminance conversion soft X-ray transmission image P104 by performing luminance conversion on the post-processing soft X-ray transmission image P103 based on the complemented smooth luminance conversion table T102 stored in the storage unit.

Then, the division unit 414 generates the result image P300 in which the object A is erased by dividing, for each pixel, the luminance value of the post-luminance conversion soft X-ray transmission image P104 and the luminance value of the hard X-ray transmission image P200. Then, the filter unit 415 generates the noise-removed image P301 by removing the random noise that is included in the result image P300. Then, the binarization unit 416 generates the binarized image P302 by binarizing the noise-removed image P301. Then, the image processing unit 400 generates the final image P400 by superimposing the binarized linage P302 and the hard X-ray transmission image P200 and detects the foreign matter S included in the object A.

[Action and Effect]

In the X-ray inspection apparatus 100, the plurality of direct conversion-type X-ray detection element arrays 311 that convert soft X-rays into electric charge are used, and the image processing unit 400 generates the edge detected image P101 by carrying out the edge detection processing on the soft X-ray transmission image P100, generates the horizontal direction gradation image P102 by carrying out the horizontal direction gradation processing on the edge detected image P101, and generates the post-processing soft X-ray transmission image P103 by synthesizing the soft X-ray transmission image P100 and the horizontal direction gradation image P102. As a result, the luminance reduction line L appearing due to sensitivity reduction in the connecting portions between the direct conversion-type X-ray detection element arrays 311 next to each other can be removed in the post-processing soft X-ray transmission image P103. Accordingly, the X-ray inspection apparatus 100 can accurately detect the foreign matter S by using the plurality of direct conversion-type X-ray detection element arrays 311 even in a case where a thick object A is an inspection target.

Especially, according to the X-ray inspection apparatus 100, a foreign matter S formed of a material unlikely to absorb hard X-rays and likely to absorb soft X-rays (for example, a nonmetal such as glass and rubber, and a light metal such as aluminum) can be accurately detected by acquiring the post-processing soft X-ray transmission image P103.

In addition, in the X-ray inspection apparatus 100, the image processing unit 400 generates the post-processing soft X-ray transmission image P103 from the soft X-ray transmission image P100 of the object. A generated based on the soft X-ray detection signal output from the direct conversion-type X-ray detection element arrays 311. Then, the image processing unit 400 generates the final image P400 by synthesizing the post-processing soft X-ray transmission image P103 and the hard X-ray transmission image P200 of the object A generated based on the hard X-ray detection signal output from the indirect conversion-type X-ray detection element arrays 321 and detects the foreign matter S included in the object A. In this manner, the foreign matter S can be more accurately detected by using the indirect conversion-type X-ray detection element arrays 321 and the direct conversion-type X-ray detection element arrays 311 together.

Especially with the X-ray inspection apparatus 100, the foreign matter S formed of a material unlikely to absorb hard X-rays and likely to absorb soft X-rays (for example, a nonmetal such as glass and rubber, and a light metal such as aluminum) can be more accurately detected by using the post-processing soft X-ray transmission image P103 and the hard X-ray transmission image P200 together.

[Modification Example]

One embodiment of the present disclosure is not limited to the embodiment of the present disclosure described above.

For example, the image processing unit 400 may detect the foreign matter S included in the object A by generating a synthetic X-ray transmission image by synthesizing the soft X-ray transmission image P100 of the object A generated based on the soft X-ray detection signal output from the direct conversion-type X-ray detection element arrays 311 and the hard X-ray transmission image P200 of the object A generated based on the hard X-ray detection signal output from the indirect conversion-type X-ray detection element arrays 321, generating the horizontal direction gradation image by carrying out the edge detection processing and the horizontal direction gradation processing on the synthetic X-ray transmission image, and generating the post-processing X-ray transmission image as the final image P400 by synthesizing the synthetic X-ray transmission image and the horizontal direction gradation image. Also in this case, the foreign matter S can be more accurately detected by using the indirect conversion-type X-ray detection element arrays 321 and the direct conversion-type X-ray detection element arrays 311 together.

In the X-ray inspection apparatus 100, the foreign matter S included in the object A may be detected by using any one of the soft X-ray trans mission image P100 and the hard X-ray transmission image P200. Alternatively, the foreign matter S included in the object A may be detected by using both the soft X-ray transmission image P100 and the hard X-ray transmission image P200 while weight adjustment is performed. In addition, the X-ray inspection apparatus 100 may detect the foreign matter S included in the object A by using only the soft X-ray transmission image P100 without including the indirect conversion-type X-ray detector 320.

In addition, the direct conversion-type X-ray detection element arrays 311 is not limited to one detecting soft X-rays and the indirect conversion-type X-ray detection element arrays 321 is not limited to one detecting hard X-rays insofar as the direct conversion-type X-ray detection element arrays 311 detects X-rays of the first energy hand and the indirect conversion-type X-ray detection element arrays 321 detects X-rays of the second energy band larger than the first energy band.

Figure 18:
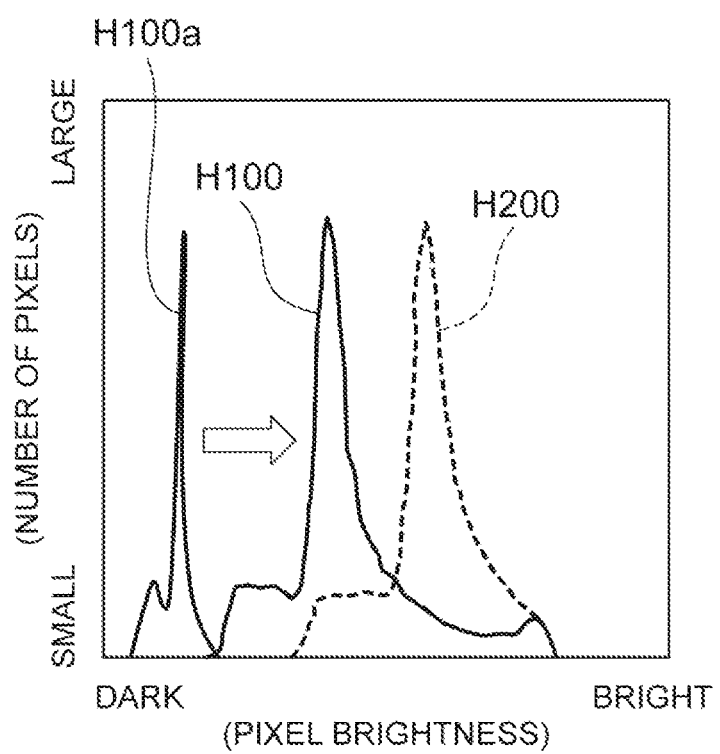
FIG. 18 is a diagram illustrating a luminance histogram of the post-processing soft X-ray transmission image and the hard X-ray transmission image according to a modification example.

In addition, the image processing unit 400 may have an image luminance adjustment unit as follows. In other words, as illustrated in FIG. 18, a soft X-ray luminance histogram H100a illustrating the luminance distribution of the post-processing soft X-ray transmission image P103 may be narrower than the hard X-ray luminance histogram H200 illustrating the luminance distribution of the hard X-ray transmission image P200. In such a case, the image luminance adjustment unit converts the soft X-ray luminance histogram H100a into the soft X-ray luminance histogram H100 by expanding the luminance distribution of the post-processing soft X-ray transmission image P103 in order to accurately carry out adjustment of the latter stage (refer to FIG. 15). As a result, an equivalent brightness can be automatically obtained even in a case where the thickness of the object A is uneven. As an example, histogram expansion processing and histogram flattening processing disclosed in <http://codezine.jp/article/detail/214> [searched on Oct. 5, 2015] can he used.

The invention claimed is:

1. An X-ray inspection apparatus comprising:
a conveyance unit configured to convey an object to be inspected;
an X-ray radiation unit configured to radiate X-rays to the object conveyed by the conveyance unit;
an X-ray detection unit configured to detect the X-rays radiated to the object conveyed by the conveyance unit; and
an image processing unit configured to generate an X-ray transmission image of the object based on a detection signal output from the X-ray detection unit and carry out image processing on the X-ray transmission image,
wherein the X-ray detection unit includes a plurality of direct conversion-type X-ray detection element arrays disposed side-by-side in rows along a direction intersecting both a conveyance direction in which the object is conveyed by the conveyance unit and a radiation direction in which the X-rays are radiated by the X-ray radiation unit and configured to convert X-rays of a first energy band into electric charge,
wherein the image processing unit includes:
an edge detection unit configured to carry out edge detection processing on the X-ray transmission image to generate an edge detected image,
a horizontal direction gradation unit configured to carry out horizontal direction gradation processing along the conveyance direction on the edge detected image to generate a horizontal direction gradation image, and
a synthesizing unit configured to synthesize the X-ray transmission image and the horizontal direction gradation image to generate a post-processing X-ray transmission image,
wherein the X-ray detection unit further includes a plurality of indirect conversion-type X-ray detection element arrays disposed side-by-side in rows along the direction intersecting both the conveyance direction in which the object is conveyed by the conveyance unit and the radiation direction in which the X-rays are radiated by the X-ray radiation unit and configured to convert X-rays of a second energy band larger than the first energy band into light and convert the light into electric charge, and
wherein the image processing unit:
synthesizes a first X-ray transmission image of the object generated based on a first detection signal output from the direct conversion-type X-ray detection element arrays and a second X-ray transmission image of the object generated based on a second detection signal output from the indirect conversion-type X-ray detection element arrays to generate a synthetic X-ray transmission image, and
generates the post-processing X-ray transmission image by using the synthetic X-ray transmission image as the X-ray transmission image.

2. The X-ray inspection apparatus according to claim 1, wherein the X-rays of the first energy band are soft X-rays.

3. The X-ray inspection apparatus according to claim 1, wherein the X-rays of the second energy band are hard X-rays.

4. The X-ray inspection apparatus according to claim 2, wherein the X-rays of the second energy band are hard X-rays.

5. An X-ray inspection apparatus comprising:
a conveyance unit configured to convey an object to be inspected;
an X-ray radiation unit configured to radiate X-rays to the object conveyed by the conveyance unit
an X-ray detection unit configured to detect the X-rays radiated to the object conveyed by the conveyance unit and
an image processing unit configured to generate an X-ray transmission image of the object based on a detection signal output from the X-ray detection unit and carry out image processing on the X-ray transmission image,
wherein the X-ray detection unit includes a plurality of direct conversion-type X-ray detection element arrays disposed side-by-side in rows along a direction intersecting both a conveyance direction in which the object is conveyed by the conveyance unit and a radiation direction in which the X-rays are radiated by the X-ray radiation unit and configured to convert X-rays of a first energy band into electric charge,
wherein the image processing unit includes:
an edge detection unit configured to carry out edge detection processing on the X-ray transmission image to generate an edge detected image,
a horizontal direction gradation unit configured to carry out horizontal direction gradation processing along the conveyance direction on the edge detected image to generate a horizontal direction gradation image, and
a synthesizing unit configured to synthesize the X-ray transmission image and the horizontal direction gradation image to generate a post-processing X-ray transmission image,
wherein the X-ray detection unit further includes a plurality of indirect conversion-type X-ray detection element arrays disposed side-by-side in rows along the direction intersecting both the conveyance direction in which the object is conveyed by the conveyance unit and the radiation direction in which the X-rays are radiated by the X-ray radiation unit and configured to convert X-rays of a second energy band larger than the first energy band into light and convert the light into electric charge, and
wherein the image processing unit;
generates the post-processing X-ray transmission image by using, as the X-ray transmission image, a first X-ray transmission image of the object generated based on a first detection signal output from the direct conversion-type X-ray detection element arrays, and
synthesizes the post-processing X-ray transmission image and a second X-ray transmission image of the object generated based on a second detection signal output from the indirect conversion-type X-ray detection element arrays.

6. The X-ray inspection apparatus according to claim 5, wherein the X-rays of the second energy band are hard X-rays.

* * * * *